(12) United States Patent
Hirota

(10) Patent No.: US 8,351,191 B2
(45) Date of Patent: Jan. 8, 2013

(54) HOUSING FOR PORTABLE DISPLAY DEVICE, AND PORTABLE DISPLAY DEVICE

(75) Inventor: Mitsuo Hirota, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 86 days.

(21) Appl. No.: 13/072,726

(22) Filed: Mar. 27, 2011

(65) Prior Publication Data

US 2011/0170248 A1    Jul. 14, 2011

Related U.S. Application Data

(63) Continuation-in-part of application No. PCT/JP2009/055094, filed on Mar. 17, 2009.

(30) Foreign Application Priority Data

Sep. 30, 2008 (JP) .................. 2008-252948

(51) Int. Cl.
*H05K 5/02* (2006.01)
*A47B 81/00* (2006.01)

(52) U.S. Cl. ......... 361/679.01; 361/679.02; 361/679.03; 312/223.1; 312/223.2; 312/223.3; 174/50; 174/50.51; 174/50.54; D14/188; D14/341

(58) Field of Classification Search ............. 361/679.01, 361/679.02, 679.03, 679.09, 679.21, 679.26, 361/679.27, 679.3, 679.22; 312/223.2, 223.3; 235/462.45, 472.01, 462.01, 462.43, 472.02; 345/156, 157, 167; 174/50, 50.51, 50.54; D14/341, 188
See application file for complete search history.

(56) References Cited

U.S. PATENT DOCUMENTS

| D391,259 S | * | 2/1998 | Ito et al. ...................... D14/188 |
| 6,844,869 B1 | * | 1/2005 | Kukita .......................... 345/157 |
| 7,175,094 B2 | * | 2/2007 | Bhatia et al. ............. 235/472.01 |
| 7,444,099 B2 | * | 10/2008 | Eguchi .......................... 399/107 |
| 7,885,653 B2 | * | 2/2011 | Yamamoto et al. ........ 455/432.3 |

(Continued)

FOREIGN PATENT DOCUMENTS

JP    H09-082488 A    3/1997

(Continued)

OTHER PUBLICATIONS

Japan Patent Office, International Search Report for International Patent Application No. PCT/JP2009/055094, mailed May 19, 2009.

(Continued)

*Primary Examiner* — Michail V Datskovskiy
(74) *Attorney, Agent, or Firm* — Baker Botts L.L.P.

(57) ABSTRACT

Provided are a housing (10) for a portable display device (1) having a holding section (11) located on one side to the center line of the housing (10) that is provided with a weight adjusting section which sets a weight of the holding section (11) side of the housing (10) heavier than a weight of that portion of the housing (10) which is opposite the holding section (11), and whose weight is adjusted by at least one of methods of changing a type of a material for the housing (10), a specific gravity of the material, a density thereof, and an amount used thereof, mixing a weight adjusting substance (14) in the material, and mounting a weight adjusting substance to the housing (10), and a portable display device.

10 Claims, 5 Drawing Sheets

U.S. PATENT DOCUMENTS

| | | | |
|---|---|---|---|
| 8,204,559 B2 * | 6/2012 | Honma | 455/575.3 |
| 2009/0002926 A1 * | 1/2009 | Matsui et al. | 361/680 |
| 2009/0108590 A1 * | 4/2009 | Mabuchi et al. | 290/1 R |
| 2011/0112399 A1 * | 5/2011 | Willems et al. | 600/437 |

FOREIGN PATENT DOCUMENTS

| | | | |
|---|---|---|---|
| JP | 2002-328424 A | | 11/2002 |
| JP | 2006-119979 A | | 5/2006 |
| JP | 20066119979 A | * | 5/2006 |
| JP | 2009-133901 A | | 6/2009 |
| WO | WO99/23800 | * | 5/1999 |
| WO | 2010038490 A1 | | 4/2010 |

OTHER PUBLICATIONS

Japan Patent Office, Notification of Reasons for Rejection for Japanese Patent Application No. 2008-252948, dispatched Mar. 21, 2012.

* cited by examiner

Fig. 9

| Foaming methods | | Resin materials |
|---|---|---|
| Foaming agent decomposition method | Atmospheric expansion | PE, PP, Rigid PVC |
| | Extrusion foaming | PE, PP, Rigid PVC, ABS |
| | Press foaming | PE, PP, Rigid PVC, PMMA |
| | Injection foam molding | PP, PS, Various engineering plastics |
| Solvent evaporation method | Bead foaming | PS, PE, PP |
| | Extrusion foaming | PS, PE, Rigid PVC |
| Chemical reaction method | Chemical foaming | PU |
| | Physical foaming | PU |

Fig. 10

| Resin materials | Specific gravity | |
|---|---|---|
| Polypropylene (PP) | 0.90-0.91 | Small |
| Polyethylene (PE) | 0.95-0.97 | Small |
| ABS resin (ABS) | 1.01-1.05 | Small |
| Polystyrene (PS) | 1.03-1.06 | Small |
| Polyphenylene ether (PPE) | 1.04-1.09 | Small |
| Polyamide resin (PA6 or the like) | 1.12-1.14 | Intermediate |
| Methacryl resin (PMMA) | 1.17-1.20 | Intermediate |
| Polycarbonate (PC) | 1.2 | Intermediate |
| Polyurethane (PU) | 1.2 | Intermediate |
| Polyester (PET or the like) | 1.29-1.40 | Large |
| Polyacetal (POM) | 1.42 | Large |
| Vinyl chloride resin (PVC) | 1.30-1.58 | Large |

HOUSING FOR PORTABLE DISPLAY DEVICE, AND PORTABLE DISPLAY DEVICE

CROSS-REFERENCE TO RELATED APPLICATION

This application is a continuation of International Application No. PCT/JP2009/055094, filed Mar. 17, 2009, which is entitled to the benefit of the filing date of Japanese patent application: JP2008-252948, filed on Sep. 30, 2008, the disclosures of all of which are herein incorporated by reference in its entirety.

TECHNICAL FIELD

The present invention relates to a housing for a portable display device which has a display section at a front of the device such as an electronic paper terminal, a pen input type portable electronic computer, or a portable game device, and is used while a part of the housing which surrounds all around the display section is held, and it also relates to a portable display device.

BACKGROUND ART

In the electronic paper terminal, the pen input type portable electronic computer, and the portable game device, it is popular to be configured in such a way that the display section occupies most of the front side of the device, and is surrounded all around by a housing (such a device is called "portable display device" herein). Recent portable display devices have been designed to have higher definition and larger display sections regardless of the display type, such as liquid crystal, organic electroluminescence or electrophoresis.

In such a portable display, the center of gravity is positioned near the center portion where the display section is located, so that a load may be applied to hands holding the device depending on the position of an operation section or a holding section provided at the housing. In this respect, there is known a pen input type portable electronic computer which is configured to have command input keys provided on the upper surface of the device at a good operational position or good holding position according to the shape of the device, the weight thereof, the position of the center of gravity, and the use.

There is known a device for fire alarm equipment, though not a portable display device, which is configured to have an operation section, such as switches, provided on the hand side of the housing that constitutes the device, a battery box disposed near the operation section in the housing, and the center of gravity positioned on the hand side of the housing.

With regard to the former pen input type portable electronic computer mentioned above, it is proposed to provide command input keys at a good operational position or good holding position according to the position of the center of the device. However, in the common portable display device, the housing weighs about 30 percent of the total weight of the portable display device, and the chassis of the display section weighs another 30 percent or so. Since the housing and chassis are governing the center of gravity of a portable display device, the center of gravity of a general portable display device is located near the center portion of the device. Accordingly, the "good operational position" and the "good holding position" are actually determined specifically based on the center of gravity, thereby raising a problem that there is no flexibility for the mounting position of the operation section or the holding section.

Even if the former pen input type portable electronic computer has the command input keys provided in a good operational position or good holding position, it still has a problem that the load (moment) to be applied to a device holding hand (a hand which holds the device) cannot be reduced at all since the device is configured in such a way that one side portion apart from the position of the center of gravity of the device is held.

In this respect, the latter device for fire alarm equipment shifts the position of the center of gravity of the device toward the operation section using the weight of the battery set in the battery box. Since the housing and chassis of an ordinary portable display device occupy about 60 percent of the total weight, however, merely shifting the installation position of the battery which, together with the display section or other parts, is included in the remaining 40 percent does not have a large influence on the position of the center of gravity of the device.

SUMMARY

The present invention has been made in view of the aforementioned problem, and it is an object of the invention to provide a housing for a portable display device, and a portable display device, which has the position of the center of gravity of the device shifted toward the holding section to ensure significant reduction in the load to be applied to a hand holding the device.

To achieve the object, a housing for a portable display device according to one aspect of the invention is a portable display device having a holding section located on one side of a center line of the housing and configured in such a way as to be provided with a weight adjusted section, said housing comprising a holding section side of the housing with a greater weight than a weight of a portion of the housing that is opposite the holding section, wherein a difference between the weight of the holding section side of the housing and the weight of the portion of the housing that is opposite the holding section is achieved by selecting different types of materials for the holding section and the portion of the housing that is opposite the holding section, said selecting comprising at least one of: choosing different specific gravities of the materials, choosing different densities of the materials, choosing different amounts of the materials, mixing a weight adjusting substance in the materials, and weight adjusted parts into the housing.

To achieve the object, a portable display device according to one aspect of the invention is configured to use one of the above-described housings according to the invention.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

FIG. 9 is a diagram of a list of specific examples of foaming methods of mixing air bubbles in the resin material for the housing.

FIG. 10 is a diagram of a list showing specific examples of resin materials applicable to the housing of the invention, and the specific gravities of the individual resin materials.

DESCRIPTION OF THE PREFERRED EMBODIMENTS

General Description

Figure 1:
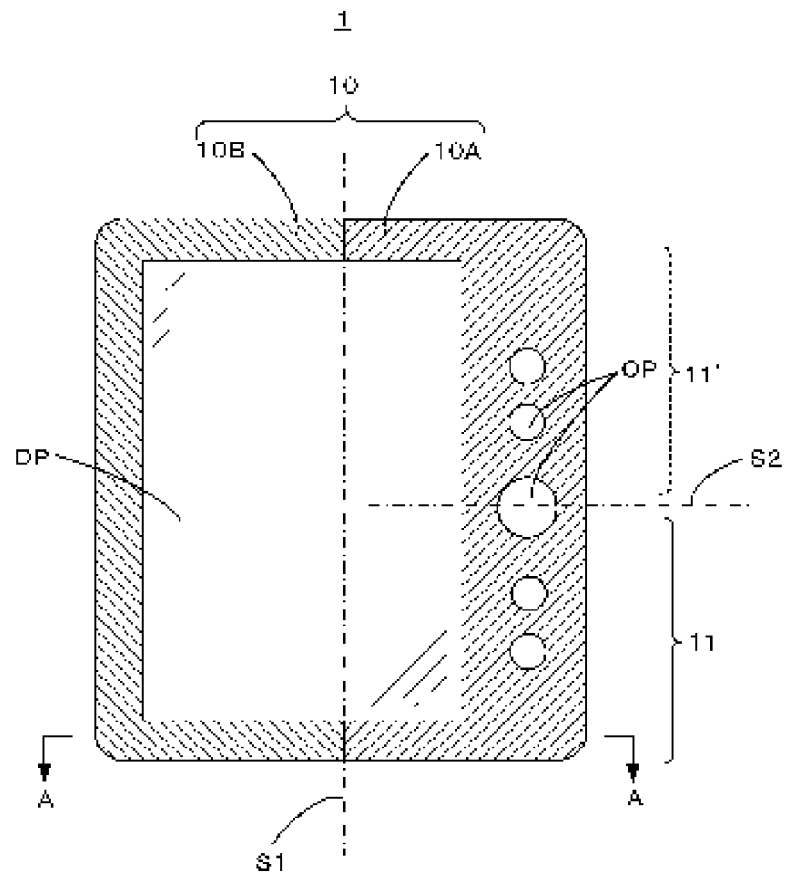
FIG. 1 is a front view showing a portable display device according to a first embodiment of the invention.

To achieve the object, a housing for a portable display device according to one embodiment of the invention is a portable display device having a holding section located on one side of a center line of the housing and configured in such a way as to be provided with a weight adjusted section, said housing comprising a holding section side of the housing with a weight greater than a weight of a portion of the housing that is opposite the holding section, wherein a difference between the weight of the holding section side of the housing and the weight of the portion of the housing that is opposite the holding section is achieved by selecting different types of materials for the holding section and the portion of the housing that is opposite the holding section, said selecting comprising at least one of: choosing different specific gravities of the materials, choosing different densities of the materials, choosing different amounts of the materials, mixing a weight adjusting substance in the materials, and assembling weight adjusted parts into the housing.

According to such a configuration, the weight of the housing can be shifted toward the holding section, thereby making it possible to bring the position of the center of gravity of the device closer to the holding section. Accordingly, since a user will hold near the position of the center of gravity of the device to handle the device, thus making it possible to significantly reduce the load applied to a hand holding the device.

Adjustment for making the weight of the holding section side of the housing heavier may be carried out within for example, about 30 percent of the weight of the housing of an ordinary portable display device, or may be carried out over the range of about 30 percent. That is, as long as it is within the limit which does not adversely affect the practical use, adjustment to make the holding section of the housing heavier may be carried out over the gross weight of the existing housing. Even if the gross weight of the housing increases, the load applied to a hand holding the device is reduced as the position of the center of gravity of the device becomes close to the holding section.

The configuration to "change the type of the material" for forming the weight adjusted section includes, for example, use of resin materials of different types for the holding section of the housing and the opposite side thereof, and use of a metallic material for the former and a resin material for the latter.

The configuration to "change the specific gravity of the material" for forming the weight adjusted section includes, for example, use of two types of resin materials with different specific gravities, one for the holding section of the housing and the other for the opposite side thereof. The resin materials with different specific gravities will be exemplified later.

The configuration to "change the density of the material" for forming the weight adjusted section includes, for example, mixing air bubbles into the resin material for the opposite side of the housing to the holding section to make the density of the resin material different from the resin material for the holding section of the housing.

The configuration to "change the amount used of the material" for forming the weight adjusted section includes, for example, increasing the amount of the material used on the holding section side of the housing to increase the thickness of the wall portion, and decreasing the amount of the material used on the opposite side of the housing to the holding section side to make the wall portion thinner.

The configuration to "mix a weight adjusting substance in the material" includes, for example, mixing air bubbles into the resin material for the opposite side of the housing to the holding section thereof, as mentioned above, to make the opposite side of the housing to the holding section thereof lighter, or mixing a powdery or granular weight matter having heat resistance and sufficient strength (for example, powdery substance or granular substance of metal, glass or the like) into a resin material for the holding section of the housing, thereby making the holding section of the housing heavier. If the weight of the opposite side of the housing to the holding section thereof can be adjusted, the weight adjusting substance to be mixed into the material is not particularly limited.

The configuration to "mount a weight adjusting substance to the housing" for forming the weight adjusted section includes, for example, mounting a resin or metallic weight to the opposite side of the housing to the holding section thereof. The weight adjusting substance may be either detachable or may not be detachable. The weight adjusting substance may be mounted only when a user uses the portable display device.

Preferably, the foregoing housing according to the invention is configured in such a way that the material for the housing is a resin material into which air bubbles are mixed by foaming to form the weight adjusted section, and the weight of the portion of the housing which is opposite the holding section is made lighter than the weight of the holding section side of the housing by the weight adjusted section.

According to such a configuration, the weight of the holding section of the housing can be made heavier by mixing air bubbles at least into the resin material for the opposite side of the housing to the holding section thereof. The weight of the housing can be adjusted easily while maintaining the intensity needed for the housing by performing predetermined foaming (see FIG. 9) according to the type of the resin material for the housing, or by adjusting the quantity of air bubbles to be mixed into a resin material.

Preferably, the foregoing housing according to the invention is configured in such a way that the material for the housing includes two or more types of resin materials having different specific gravities, and the holding section side of the housing is formed of the resin material with a larger specific gravity while the portion of the housing which is opposite the holding section is formed of the resin material with a lighter specific gravity, thereby forming the weight adjusted section, and the weight of the holding section side of the housing is made heavier than the weight of the portion of the housing which is opposite the holding section by the weight adjusted section.

According to such a configuration, weight adjustment of the housing can be easily performed only by making the material used for the holding section of the housing and the material used for the opposite side of the housing to the holding section thereof differ from each other. As set forth in claim 4, for example, the resin materials with different specific gravities can be two or more types of resin materials selected from an acrylonitrile butadiene styrene resin, polyethylene, polypropylene, polystyrene, vinyl chloride resin, methacrylic resin, polyamide resin, polycarbonate, polyacetal, polyester, polyphenylene ether, and polyurethane. The values of the specific gravities of the resin materials are shown in FIG. 10.

Preferably, the foregoing housing according to the invention is configured in such a way that the material for the housing is a resin material, and the weight adjusted section is formed by mixing a metal powder in the resin material which is located at least on the holding section side of the housing, and the weight of the portion of the housing which is opposite the holding section is made lighter than the weight of the holding section side of the housing by the weight adjusted section.

According to such a configuration, the weight of the holding section of the housing can be made heavier by mixing a metal powder at least into the resin material for the holding section of the housing. In addition, mixing a metal powder into the resin material for the housing brings about a decorative effect to make the texture and massive appearance of the housing better.

Preferably, the foregoing housing according to the invention is configured in such a way that the weight of that portion of the holding section side of the housing which constitutes the holding section is made heaviest by at least one weight adjusted section.

According to such a configuration, the portion which constitutes the holding section of the housing can be made the heaviest, and the position of the center of gravity of the device can be brought closer to the holding section and to significantly reduce the load applied to a hand holding the device. In order to make the portion which constitutes the holding section of the housing the heaviest, it is effective to combine two or more weight adjusted sections mentioned above. For example, two or more weight adjusted sections for making the housing heavier may be combined to set the portion which constitutes the holding section of the housing heavier, and further two or more weight adjusted sections for making the other portion than the housing lighter may be combined to set the portion which constitutes the holding section of the housing the heaviest.

Preferably, the foregoing housing according to the invention is configured in such a way that the closer to the holding section a portion of the housing is located, the heavier the weight of that portion is made by at least one weight adjusted section, and the farther from the holding section a portion of the housing is located, the lighter the weight of that portion is made by the at least one weight adjusted section.

According to such a configuration, the closer to the holding section the portion of the housing is located, the heavier the weight distribution of the housing can be made, and the position of the center of gravity of the device can be brought closer to the holding section to significantly reduce the load applied to a hand holding the device. To make the weight distribution of the housing heavier toward the holding section, it is effective to combine two or more weight adjusted sections mentioned above as per the above case.

Preferably, the foregoing housing according to the invention is configured in such a way that the housing is separated into a first housing constituting the holding section side of the housing, and a second housing constituting an opposite side of the housing to the holding section, and a weight of the first housing is made heavier than a weight of the second housing by at least one weight adjusted section.

According to such a configuration, for example, it is possible to separate the housing into left and right portions, or upper and lower portions about the center line as the boundary, so that the first housing which constitutes the holding-section side half can be made heavier, and the second housing which constitutes the other half on the opposite side of the housing to the holding section can be made lighter. Alternatively, the housing can be separated into the first housing which constitutes the side close to the holding section and the second housing which constitutes the portion other than the holding section, regardless of the center line, so that the vicinity of the holding section can be particularly heavy. Further, the housing can be separated into the first housing which constitutes the holding section and the second housing which constitutes the portion other than the holding section, so that the holding section alone can be made intensively heavy. The separated first and second housings may be coupled together by any one of engagement, fitting, adhesion, two-color molding, insert molding, etc.

Preferably, the foregoing housing according to the invention is configured in such a way that the housing is separated into a holding-section housing constituting of the holding section, and a plurality of non-holding-section housings other than the holding-section housing, and at least one weight adjusted section makes a weight of the holding-section housing heaviest, makes a weight of that of the non-holding-section housings which is to be mounted closer to the holding-section housing heavier, and makes a weight of that of the non-holding-section housings which is to be mounted farther from the holding-section housing lighter.

According to such a configuration, the holding-section housing which constitutes the holding section is made heavier, the non-holding-section housing which constitutes the portion other than the holding section is made lighter, and further, closer to the holding-section housing the attachment of a part of the non-holding-section housing is positioned, the heavier the portion can be made, and the farther from the holding-section housing the attachment of a part of the non-holding-section housing is located, the lighter the portion can be made. This can provide the housing with the weight distribution such that the closer to the holding section, the heavier the weight of the portion, thereby making it possible to considerably reduce the load applied to a hand holding the device. The holding-section housing and a plurality of first and second housings may be coupled together by any one of engagement, fitting, adhesion, two-color molding, insert molding, etc. as in the above case.

To achieve the object, a portable display device according to one embodiment of the invention is configured to use any one of the foregoing housings according to the invention. This configuration can permit the weight of the housing to be shifted toward the holding section, so that the position of the center of gravity of the device can be made closer to the holding section. This makes it possible to considerably reduce the load applied to a hand holding the device. It is to be noted that the "portable display device" according to the invention includes a wide variety of devices with comparatively large space for the display section, such as an electronic paper terminal, a pen input type portable electronic computer, or a portable game device, and a portable display device.

Effect of the Invention

As mentioned above, the housing for a portable display device according to the invention, and the portable display device according thereto can permit the position of the center of gravity of the device to be shifted toward the holding section, thereby making it possible to significantly reduce the load to be applied to a hand holding the device.

DESCRIPTION OF ILLUSTRATED EMBODIMENTS

A housing for a portable display device according to one embodiment of the invention, and a portable display device according thereto will be described below referring to the accompanying drawings.

[First Embodiment]

Figure 2:
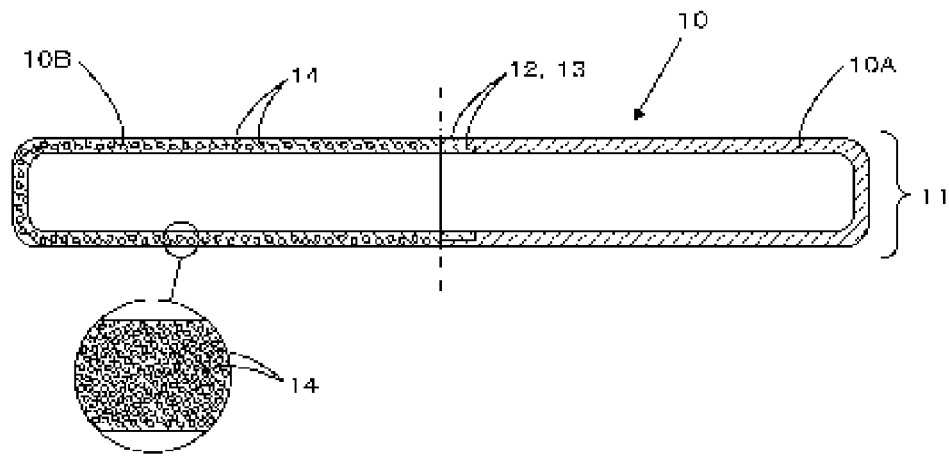
FIG. 2 is a cross-sectional view of FIG. 1 along A-A.

FIG. 1 is a front view showing a portable display device according to a first embodiment of the invention. FIG. 2 is a cross-sectional view of FIG. 1 along A-A. The portable display device according to the embodiment is configured in such a way that air bubbles as a weight adjusting substance is mixed into a resin material for a housing opposite to a holding section as a weight adjusted section for adjusted the weight of the housing.

In FIG. 1, a portable display device 1 is, for example, an electronic paper terminal, and is provided with a display section DP of an electrophoresis type which has a touch panel provided on the top surface. The periphery of this display section DP is surrounded with a frame-shaped housing 10. A plurality of operation sections OP are provided on the right-hand side of the housing 10 with respect to a center line S1 longitudinal in the diagram, and the lower right half of the housing 10 serves as a holding section 11 for a right-handed user. A right-handed user uses the portable display device 1 while holding the holding section 11 with the right hand.

The upper right half of the housing 10 is a holding section 11' for a left-handed user. When the portable display devices 1 in the diagram is rotated 180 degrees, a left-handed user holds the holding section 11', located lower left, with the left hand, to use the portable display device 1. The portable display device 1 has a function to turn the display direction of display section DP up side down. This configuration for both right-handed and left-handed users is also taken in second to fourth embodiments to be described later.

According to the embodiment, as shown in FIGS. 1 and 2, the housing 10 is separated into left and right parts, namely, first and second housings 10A and 10B with the center line S1 being the boundary. The first and second housings 10A and 10B are both formed of resin materials of the same type to the same thickness, and are coupled together by fitting their fitting claws 12, 13 one over the other. The left column in FIG. 10 shows a list of specific examples of resin materials applicable to the first and second housings 10A and 10B. The right column in FIG. 10 shows a list of the specific gravities of the individual resin materials. According to the embodiment, any one type of the resin materials in the left column of FIG. 10 is selected for the resin materials for the first and second housings 10A and 10B, and the specific gravities of the resin materials are also set identical.

According to the embodiment, as shown in FIG. 2, air bubbles 14 as a weight adjusting substance are mixed uniformly into the resin material for the second housing 10B opposite the holding sections 11, 11a. The mixture of the air bubbles 14 into the second housing 10B makes the first housing 10A on the holding section 11, 11a side heavier than the second housing 10B. This shifts the position of the center of gravity of the portable display device 1 toward the holding sections 11, 11a.

As specific examples of methods of mixing the air bubbles 14 as a weight adjusting substance into the resin material for the second housing 10B, foaming methods according to the types of the resin material are enumerated in FIG. 9.

<Foaming Agent Decomposition Method>

In a foaming agent decomposition method, a pyrolysis foaming agent which is chemically decomposed to produce a gas (e.g., ADCA=azodicarbonamide) is uniformly dispersed into a resin material by melting kneading beforehand, after which it is decomposed for foaming. The method is classified into atmospheric expansion and expansion under pressure according to the foaming conditions, and the expansion under pressure includes press foaming, extrusion foaming, and injection foam molding.

In the atmospheric expansion, a pyrolysis foaming agent is uniformly dispersed in a resin material, and is overheated in an oven or the like under atmospheric pressure to be decomposed, then the resin material is expanded with the produced bubbles. Such atmospheric expansion can be applied to polyethylene (PE), polypropylene (PP), and hard vinyl chloride (rigid PVC), and is suitable for formation of a foam (air-bubble mixed resin material) of low to high magnifications. The lower the magnification, the lower the bubble density in a resin material becomes, and the higher the magnification, the higher the bubble density in a resin material becomes. Therefore, the higher the magnification, the lighter the resin material becomes.

In the extrusion foaming, a pyrolysis foaming agent is uniformly dispersed in a resin material with an extruder, and is decomposed and held under high pressure, and the resin material is extruded from a die to cause foaming. Such extrusion foaming can be applied to polyethylene, polypropylene, a hard vinyl chloride resin, and an ABS resin, and is suitable for formation of a foam with low to intermediate magnifications.

In the press foaming, a pyrolysis foaming agent is uniformly dispersed in a resin material, and is decomposed in a stamping die at high temperature and under high pressure, and the resin material is expanded with the gas at the same time as depressurization. Such press foaming can be applied to polyethylene, polypropylene, a hard vinyl chloride resin, and an acrylic resin (PMMA), and is suitable for formation of a foam with intermediate to high magnifications.

In the injection foam molding, a pyrolysis foaming agent is uniformly dispersed in a resin material with an injection molder, and is decomposed at the same time, and injection foam molding is carried out in a die under maintained pressure. Such injection foam molding can be applied to polypropylene, polystyrene (PS), and various types of engineering plastics, and is suitable for formation of a foam of low to intermediate magnifications.

<Solvent Evaporation Method>

In the solvent evaporation method, after an evaporative foaming agent is uniformly dissolved into a molten resin material under high pressure, the pressure is reduced, thereby setting the gas concentration of the decomposed evaporative foaming agent to the dissolving saturation limit. The pressure is further reduced to set the gas concentration into an over-saturation state, and finally, the resin material and the gaseous evaporative foaming agent are separated to produce air bubbles. The solvent evaporation method includes bead foaming, extrusion foaming, or the like.

In the bead foaming, an evaporative foaming agent is dissolved in a bead-like resin material, which is in turn overheated to vaporize the foaming agent, causing the resin material to be expanded to the produce bubbles. Further, the resin material is subjected to re-foaming in the die thereby to be fused. Such bead foaming can be applied to polystyrene, polyethylene, and polypropylene, and is suitable for formation of a foam with intermediate to high magnifications.

In the extrusion foaming, an evaporative foaming agent is dissolved in a resin material with an extruder, and is held under high pressure, and the resin material is extruded from a die to cause foaming. Such extrusion foaming can be applied to polystyrene, polyethylene, and a hard vinyl chloride resin, and is suitable for formation of a foam with low to high magnifications.

<Chemical Reaction Method>

A gas is enclosed in a resin material at the same time as formation reaction of polymer in chemical reaction. The chemical reaction method is classified into chemical foaming and physical foaming according to the gas generation method.

The chemical foaming generates a gas based on the hardening reaction of thermosetting plastic which is a resin material, and expands the resin material with the gas to make foaming. On the other hand, the physical foaming uses reaction heat of thermosetting plastic or a resin material to vaporize an evaporative foaming agent uniformly dissolved in the resin material, then expanding the resin material to make foaming. Those chemical foaming and physical foaming can be applied to polyurethane (PU), and are suitable for formation of a foam with intermediate to high magnifications.

According to the housing 10 of the portable display device 1 according to the foregoing embodiment, the second housing 10B that constitutes the opposite side to the holding sections 11, 11' can be made lighter by mixing the air bubbles 14 into the resin material. This can make the first housing 10A on that side of the holding sections 11, 11' heavier than the second housing 10B on the opposite side, so that the position of the center of gravity of the portable display device 1 can be made closer to the holding sections 11, 11a. As a result, the user will handle the portable display device 1 with holding the neighborhood of the position of the center of gravity of the portable display device 1, thus making it possible to significantly reduce the load applied to the hand holding the portable display device 1.

Since the weight of the housing 10 is adjusted by mixing the air bubbles 14 into the second housing 10B, the gross weight of the portable display device 1 became lighter, which further reduces the load applied to the hand holding the portable display device 1. Therefore, the portable display device 1 which is light and easy to hold is realized.

[Second Embodiment]

Figure 3:
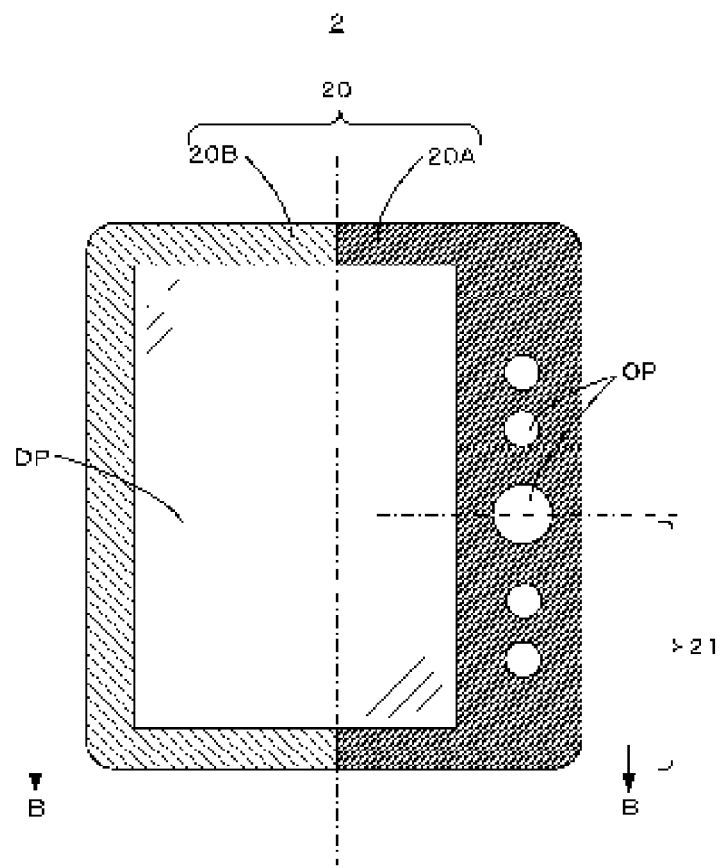
FIG. 3 is a front view showing a portable display device according to a second embodiment of the invention.
Figure 4:
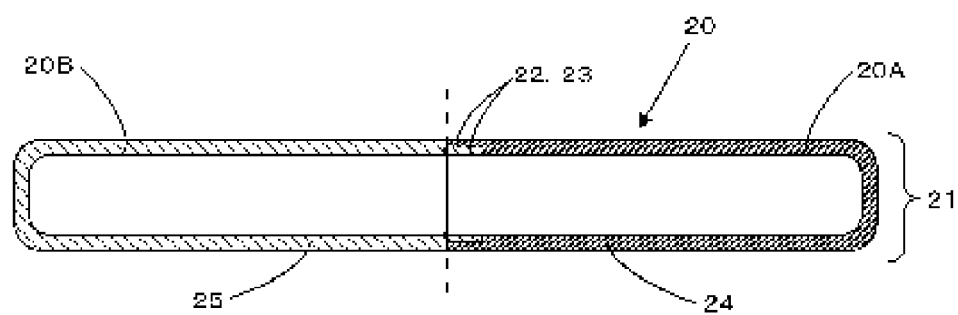
FIG. 4 is a cross-sectional view of FIG. 3 along B-B.

FIG. 3 is a front view showing a portable display device according to a second embodiment of the invention. FIG. 4 is a cross-sectional view of FIG. 3 along B-B. The portable display device according to this embodiment is configured in such a way that a weight adjusting section for adjusting the weight of the housing is formed by two types of resin materials with different specific gravities.

In FIGS. 3 and 4, a portable display device 2 according to the embodiment has a housing 20 separated into left and right parts, namely, first and second housings 20A and 20B with a center line 51 being the boundary, as per the first embodiment. The first housing 20A includes an operation section OP and a holding section 21. The first and second housings 20A and 20B are coupled together by fitting their fitting claws 22, 23 one over the other.

The first and second housings 20A and 20B are formed of two types of resin materials 24 and 25 with different specific gravities. That is, the resin material 24 with a larger specific gravity than the resin material 25 for the second housing 20B is used for the first housing 20A. The difference between the specific gravities of the resin materials 24 and 25 is shown by the densities of hatching in the diagrams for the sake of descriptive convenience.

Specific examples of the resin materials 24 and 25 with different specific gravities are shown in FIG. 10. FIG. 10 shows a list of resin materials usable for the housings arranged in order of smaller-to-larger specific gravity from the top. In the diagram, it is preferably to select a resin material with a large specific gravity as the resin material 24 for the first housing 20A on the holding section 21 side (see "large" in the diagram), and select a resin material with a small specific gravity as the resin material 25 for the second housing 20B on the opposite side to the holding section 21 (see "small" in the diagram).

For example, vinyl chloride resin with the largest specific gravity in the diagram is selected as the resin material 24 for the first housing 20A on the holding section 21 side, and polypropylene with the smallest specific gravity in the diagram is selected as the resin material 25 on the opposite side to the holding section 21. While it is preferable to combine the resin material 24 with a larger specific gravity and the resin material 25 with a lighter specific gravity from the viewpoint of making the holding section 21 side of the housing 20 heavier, it is necessary to choose two types of resin materials 24 and 25 for production of the portable display device 2 in consideration of the properties, such as the strength, durability, texture, etc. of the resin materials. In the case where the weight adjusted section according to the embodiment is combined with the weight adjusted section according to the first embodiment or a weight adjusted section according to a third embodiment to be described later to carry out weight adjustment of the housing 20, it is also possible to select the combination of resin materials with "large" and "intermediate" in the diagram or the combination of resin materials with "intermediate" and "small" in the diagram to finely adjust the weight distribution of the housing 20.

According to the housing 20 of the portable display device 2 according to the foregoing embodiment, the holding section 21 side of the housing 20 can be made heavier than the opposite side by forming the first housing 20A of the resin material 24 with a large specific gravity and forming the second housing 20B of the resin material 25 with a small specific gravity. This makes it possible to bring the position of the center of gravity of the portable display device 2 closer to the holding section 21. As a result, the load applied to a hand holding the portable display device 2 can be reduced significantly. According to the embodiment, weight adjustment of the housing 20 can be carried out very easily merely by choosing two types of resin materials 24 and 25 with different specific gravities.

[Third Embodiment]

Figure 5:
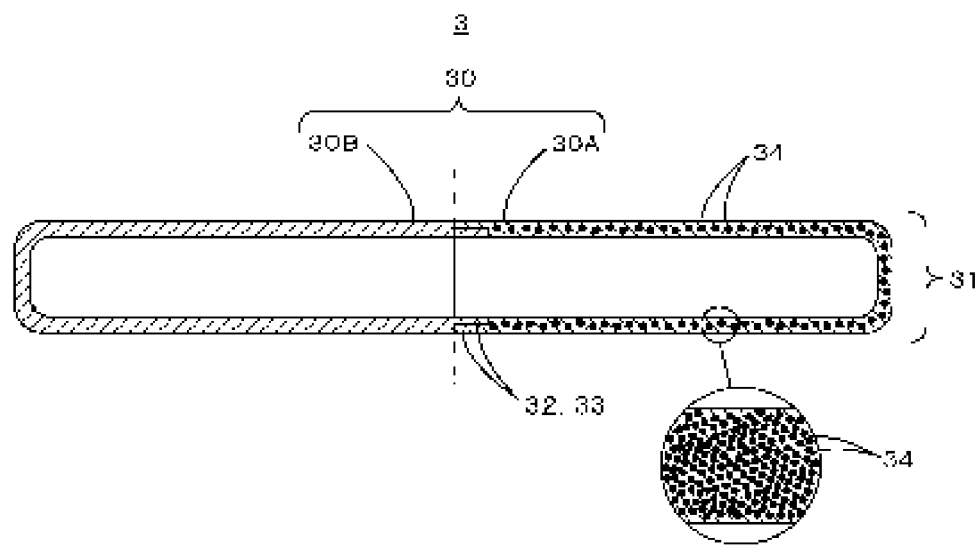
FIG. 5 is a cross-sectional view showing a portable display device according to a third embodiment of the invention.

FIG. 5 is a cross-sectional view showing a portable display device according to the third embodiment of the invention. The portable display device according to the embodiment is configured in such a way that metal powder as a weight adjusting substance is mixed into the resin material for the housing on the holding section side as a weight adjusted section for adjusting the weight of the housing.

In FIG. 5, a portable display device 3 according to the embodiment has a housing 30 separated into left and right parts, namely, first and second housings 30A and 30B with a center line S1 (see FIG. 1) being the boundary, as per the first embodiment. The first housing 30A includes an operation section OP (see FIG. 1) and a holding section 31. The first and second housings 30A and 30B are both formed of resin materials of the same type to the same thickness, and are coupled together by fitting their fitting claws 32, 33 one over the other.

This embodiment is configured so as to have metal powder 34 as a weight adjusting substance mixed into the resin material for the first housing 30A on the holding section 31 side. The first housing 30A on the holding section 31 side can be made heavier than the second housing 30B on the opposite side to the holding section 31 by mixing the metal powder 34 into the resin material this way, so that the position of the center of gravity of the portable display device 3 can be brought closer to the holding section 31. As a result, the load applied to a hand holding the portable display device 3 can be reduced significantly.

Particularly, mixing the metal powder 34 into the resin material can increase the weight of the first housing 30A effectively, and make the difference between the weights of the first and second housings 30A and 30B larger when the housing 30 is separated into the first and second housings 30A and 30B as in the embodiment. In addition, mixing the metal powder 34 into the resin material for the first housing 30A brings about the decorative effect of making the texture and massive appearance of the first housing 30A better.

A variety of weight materials which have larger specific gravities than that of the resin material for the first housing 30A and have heat resistance and sufficient strengths can be used as the weight adjusting substance to be mixed into the resin material for the first housing 30A. For example, powdery or granule glass may be mixed into the resin material for the first housing 30A instead of the metal powder 34.

[Fourth Embodiment]

Figure 6:
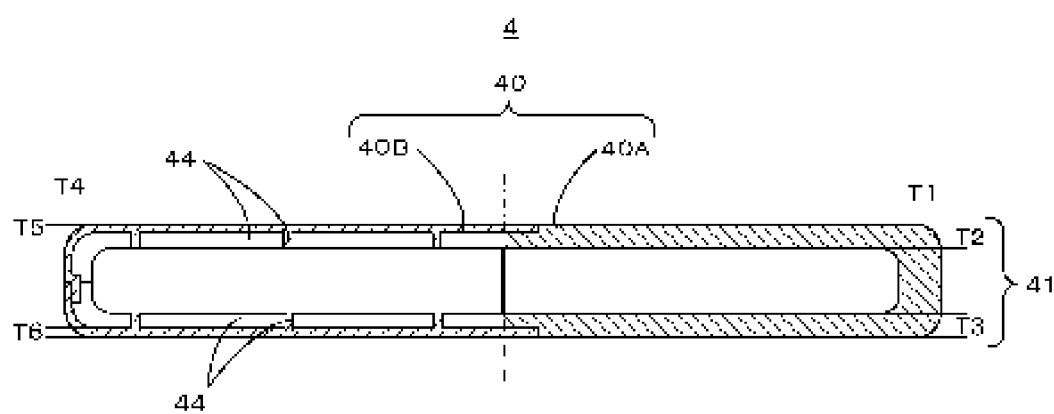
FIG. 6 is a cross-sectional view showing a portable display device according to a fourth embodiment of the invention.

FIG. 6 is a cross-sectional view showing a portable display device according to a fourth embodiment of the invention. The portable display device according to the embodiment is configured in such a way that the amount of the resin material used for the housing on the holding section side is increased, and the amount of the resin material used for the housing on the opposite side to the holding section side is decreased as a weight adjusted section for adjusting the weight of the housing.

In FIG. 6, a portable display device 4 according to the embodiment has a housing 40 separated into left and right parts, namely, first and second housings 40A and 40B with a center line S1 (see FIG. 1) being the boundary, as per the first embodiment. The first housing 40A includes an operation section OP (see FIG. 1) and a holding section 41. The first and second housings 40A and 40B are both formed of resin materials of the same type, and are coupled together by fitting their fitting claws 42, 43 one over the other.

The amount of the resin material used to form the side wall, the top wall, and the bottom wall of the first housing 40A on the holding section 41 side are increased to increase the thicknesses of the individual walls (see thickened portions T1, T2 and T3 in the diagram). On the other hand, the amount of the resin material used to form the side wall, the top wall, and the bottom wall of the second housing 40B on the opposite side to the holding section 41 are decreased to decrease the thicknesses of the individual walls (see thinned portions T4, T5 and T6 in the diagram). In addition, a plurality of reinforcing ribs 44, 44, 44, . . . which cross in the vertical and horizontal directions are integrally formed at the bottom side of the second housing 40B to secure the strengths needed for intensity required for the thinned portions T4, T5 and T6.

According to the housing 40 of the portable display device 4 according to the foregoing embodiment, the amount of the resin material used for the first housing 40A is increased, and the amount of the resin material used for the second housing 40B is decreased, so that the first housing 40A on the holding section 41 side can be made heavier than the second housing 40B on the opposite side to the holding section 41, permitting the position of the center of gravity of the portable display device 4 to become closer to the holding section 41. As a result, the load applied to a hand holding the portable display device 4 can be reduced significantly.

From the viewpoint of not increasing the gross weight of the portable display device 4, it is preferable to set the amount of the resin material for the first housing 40A increased. From the viewpoint of reducing the load applied to a hand holding the portable display device 4, however, the amount of the resin material for the first housing 40A increased may be set equal to or greater than the amount of the resin material for the second housing 40B decreased, within the range where the practical weight of the portable display device 4 is not exceeded (e.g., within the range of about 300 g to 1000 g).

[Fifth Embodiment]

Figure 7:
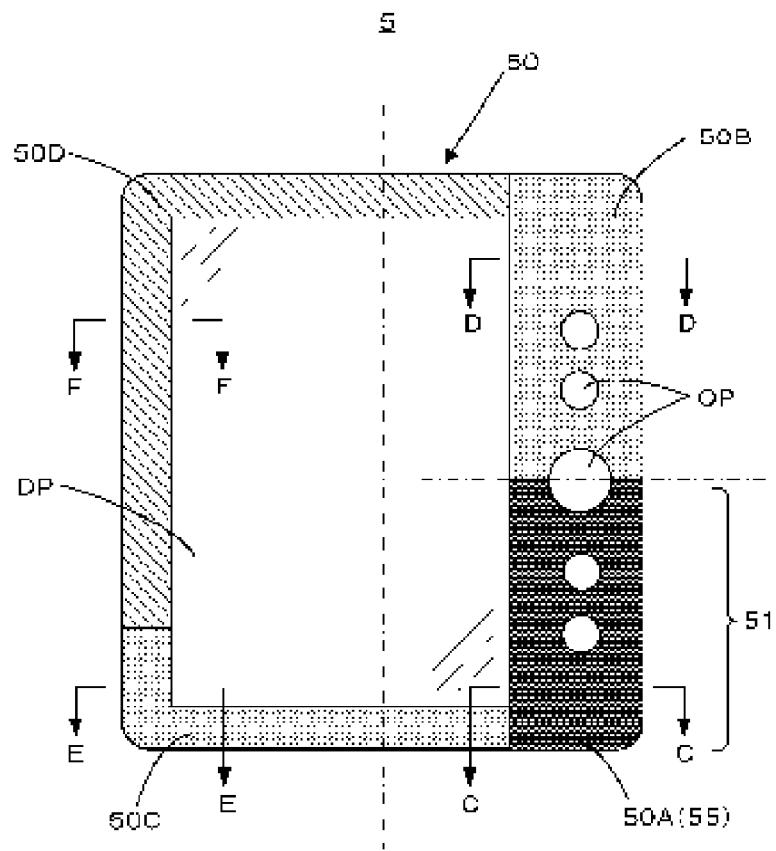
FIG. 7 is a front view showing a portable display device according to a fifth embodiment of the invention.
Figure 8:
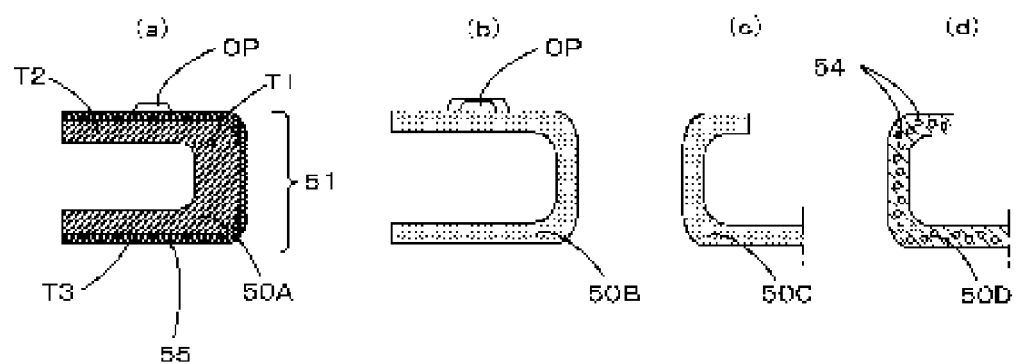
FIG. 8(*a*) is a cross-sectional view of FIG. 7 along C-C, FIG. 8(*b*) is a cross-sectional view of FIG. 7 along D-D, FIG. 8(*c*) is a cross-sectional view of FIG. 7 along E-E, and FIG. 8(*d*) is a cross-sectional views of FIG. 7 along F-F.

FIG. 7 is a front view showing a portable display device according to a fifth embodiment of the invention. FIG. 8(*a*) is a cross-sectional view of FIG. 7 along C-C, FIG. 8(*b*) is a cross-sectional view of FIG. 7 along D-D, FIG. 8(*c*) is a cross-sectional view of FIG. 7 along E-E, and FIG. 8(*d*) is a cross-sectional views of FIG. 7 along F-F.

In FIG. 7, a portable display device 5 according to this embodiment is configured so that a housing 50 is separated into four parts, namely, a holding-section housing 50A which constitutes a holding section 51, and three non-holding-section housings 50B, 50C, and 50D other than the holding-section housing 50A, and a plurality of weight adjusted sections are combined in such a way that the holding-section housing 50A is made the heaviest, the closer to the holding-section housing 50A the three non-holding-section housings 50B, 50C, and 50D are located, the heavier their weights become, and the farther from the holding-section housing 50A the three non-holding-section housings 50B, 50C, and 50D are located, the lighter their weights become. The portable display device 5 according to the embodiment is dedicated for a right-handed user and is not provided with the configurations of the first to fourth embodiments which are designed for both a right-handed user and a left-handed user.

The holding-section housing 50A is made heavier than any of the other non-holding-section housings 50B to 50D. As shown in FIG. 8(*a*), the holding-section housing 50A has a first weight adjusted section formed of a resin material with a larger specific gravity than that of any of the other non-holding-section housings 50B-50D (see the hatching of the portion indicated by reference numeral 50A in FIG. 8(*a*)).

The amount of the resin material used for the holding-section housing 50A is increased as a second weight adjusted section, and all of the side wall, the top wall and the bottom wall become thickened portions T1, T2, and T3. Further, a weight adjusting substance 55 is mounted on the outer portion of the holding-section housing 50A as a third weight adjusted section. This weight adjusting substance 55 is, for example, a metal or resin cover. The weight adjusting substances 55 may be either detachable or not detachable to the holding-section housing 50A. The design of the holding-section housing 50A may be made modifiable by preparing a plurality of weight adjusting substances 55, 55, 55, . . . of different shapes, different patters, different colors, different materials, etc., and changing these weight adjusting substances 55, 55, 55, . . . according to the preference of the user.

The non-holding-section housings 50B and 50C mounted adjacent to the holding-section housing 50A are both formed of resin materials of the same specific gravity and the same type to the same thickness, as shown in FIGS. 8(*b*) and 8(*c*) (see the gray portions indicated by reference numerals 50B and 50C in FIGS. 8(*b*) and 8(*c*)). As the weight adjusted sections of the non-holding-section housings 50B and 50C, the specific gravities of their resin materials are made smaller than the specific gravity of the holding-section housing 50A, and are made larger than the specific gravity of the resin material for the non-holding-section housing 50D to be discussed later (see "50A>50B=50C>50D" in FIG. 8 for the specific gravities of the resin materials).

The non-holding-section housing 50D mounted on the diagonal line of the holding-section housing 50A, as shown in FIG. 8(*d*), has a first weight adjusted section formed of a resin material with a smaller specific gravity than that of any one of the other housings 50A-50C, and has the same thickness as that of the non-holding-section housing 50B, 50C (see the hatching of the portion indicated by reference numeral 50D in FIG. 8(*d*)). The non-holding-section housing 50D has air bubbles mixed into the resin material as a second weight adjusted section, and has a weight lighter than the weight of any one of the other housings 50A-50C.

According to the embodiment, the holding-section housing 50A and the non-holding-section housings 50B-50D are coupled together by fitting their fitting claws (not shown) one over another as per the first to fourth embodiments. When the melting point temperatures of the resin materials for the non-holding-section housings 50B and 50C are higher than the melting point temperatures of the holding-section housing 50A and the non-holding-section housing 50D, the non-holding-section housings 50B and 50C are formed previously, after which the holding-section housing 50A and the non-holding-section housing 50D can be integrated with the non-holding-section housings 50B and 50C in two color molding. When the melting point temperatures of the resin materials for the non-holding-section housings 50B and 50C are lower than the melting point temperatures of the holding-section housing 50A and the non-holding-section housing 50D, on the other hand, the holding-section housing 50A and the non-holding-section housing 50D are formed previously, after which the non-holding-section housings 50B and 50C can be integrated with the holding-section housing 50A and the non-holding-section housing 50D in two color molding.

According to the housing 50 of the portable display device 5 according to the foregoing embodiment, it is possible to make heavy the holding-section housing 50A which constitutes the holding section 51, make light the non-holding-section housings 50B-50D which constitute other portions than the holding section 51, and further set the three non-holding-section housings 50B, 50C, and 50D in such a way that the closer to the holding-section housing 50A the three non-holding-section housings 50B, 50C, and 50D are located, the heavier their weights become, and the farther from the holding-section housing 50A the three non-holding-section housings 50B, 50C, and 50D are located, the lighter their weights become. This can provide the housing with the weight distribution such that the closer to the holding section 51, the heavier the housing becomes, so that the position of the center of gravity of the portable display device 5 can be brought closer to the holding section 51, thereby significantly reducing the load to be applied to a hand holding the portable display device 5.

It seems possible that the housing structure according to the invention can effectively reduce the load to be applied to a hand holding the portable display device particularly when the housing is adapted to the housing of a portable display device whose gross weight is about 300 g to 1000 g. That is, when the gross weight of a portable display device is less than about 300 g, the whole device is light enough, so that even when one side to the center line of the device is held, a large load is not applied to a hand holding the portable display device. When the gross weight of the portable display device exceeds about 1000 g, on the other hand, even if the position of the center of gravity of the device is shifted toward the holding section, it does not make any difference, and a hand holding the portable display device should support a weight over about 1000 g. It is to be noted however that even when the gross weight of a portable display device exceeds about 1000 g, the use of the housing structure according to the invention reduces the load to be applied to a hand holding the portable display device as compared with the case where the housing structure according to the invention is not adopted.

[Other Modifications]

The housing of a portable display device according to the invention and a portable display device according thereto are not limited to the foregoing individual embodiments. For example, the design of the housing of the portable display device is not limited to what is illustrated in diagrams, and the invention can be applied to housings with various designs. Application of the invention is not limited to the housing of an electronic paper terminal like those of the foregoing individual embodiments. The invention can applied to a variety of housings each of which has the periphery of the display section surrounded and has the holding section located to one side to the center line, such as that of a pen input type portable electronic computer or a portable game device.

Although the housings 10 to 40 are each separated into two parts, nearly halved, with the longitudinal center line S1 of the portable display devices 1, 2, 3, 4 being the boundary according to the first to fourth embodiments, the housing may be separated so that the first housing 10A, 20A, 30A, 40A on the holding section 11, 21, 31, 41 side becomes a half or less. Further, the housing 10, 20, 30, 40 may be separated into two parts with a lateral center line S2 shown in FIG. 1 being the boundary.

What is claimed is:

1. A housing for a portable display device comprising:
a holding section located on one side of a center line of the housing that is provided with a weight adjusted section, said housing comprising a holding section side of the housing with a weight greater than a weight of a portion of the housing that is opposite the holding section, wherein a difference between the weight of the holding section side of the housing and the weight of the portion of the housing that is opposite the holding section is achieved by selecting different types of materials for the holding section and the portion of the housing that is opposite the holding section, said selecting comprising at least one of: choosing different specific gravities of the materials, choosing different densities of the materials, and choosing different amounts of the materials, mixing a weight adjusting substance in the materials, and assembling weight adjusted parts into the housing.

2. The housing according to claim 1,
wherein a material for the housing comprises a resin material into which air bubbles are mixed by foaming to form the weight adjusted section, and
wherein the weight adjusted section makes the weight of the portion of the housing that is opposite the holding section is made less than the weight of the holding section side of the housing.

3. The housing according to claim 1,
wherein the material for the housing comprises at least two types of resin materials with different specific gravities, wherein the holding section side of the housing is formed of the resin material with a greater specific gravity, and the portion of the housing that is opposite the holding section is formed of the resin material with less specific gravity, thereby forming the weight adjusted section, and wherein the weight adjusted section makes the weight of the holding section side of the housing greater than the weight of the portion of the housing that is opposite the holding section.

4. The housing according to claim 3, wherein the at least two types of resin materials with different specific gravities are selected from an acrylonitrile butadiene styrene resin, polyethylene, polypropylene, polystyrene, vinyl chloride resin, methacrylic resin, polyamide resin, polycarbonate, polyacetal, polyester, polyphenylene ether, and polyurethane.

5. The housing according to claim 1, wherein the material for the housing comprises a resin material, and the weight adjusting section is formed by mixing a metal powder in the resin material, which is located at least on the holding section side of the housing, and wherein the weight adjusted section makes the weight of the portion of the housing that is opposite the holding section less than the weight of the holding section side of the housing.

6. The housing according to claim 1, wherein at least one weight adjusted section makes the weight of a portion of the holding section side of the housing that comprises the holding section the greatest weight among portions of the holding section side of the housing.

7. The housing according to claim 1, wherein the closer to the holding section a portion of the housing is located, the greater the weight of that portion is made by at least one weight adjusted section, and wherein the farther from the holding section a portion of the housing is located, the smaller the weight of that portion is made by the at least one weight adjusted section.

8. The housing according to claim 1, wherein the housing is separated into a first housing, which comprises the holding section side of the housing, and a second housing, which comprises a side of the housing that is opposite the holding section, and wherein at least one weight adjusted section makes a weight of the first housing greater than a weight of the second housing.

9. The housing according to claim 1, wherein the housing is separated into a holding-section housing, which comprises the holding section, and a plurality of non-holding-section housings other than the holding-section housing, wherein at least one weight adjusted section makes a weight of the holding-section housing greatest among the holding-section housing and the non-holding-section housing, wherein, in each of the non-holding-section housings, the closer the holding-section housing to a portion of the non-holding-section housings is located, the greater a weight of that portion of the non-holding-section housings is made by at least one weight adjusted section, and wherein, in each of the non-holding-section housings, the farther the holding-section housing from a portion of the non-holding-section housings is located, the smaller a weight of that portion of the non-holding-section housings is made by at least one weight adjusted section.

10. A portable display device comprising the housing as set forth in claim 1.

* * * * *